Nov. 25, 1958     E. E. HOFFMANN     2,861,861
GAS PRESSURE TESTING AND CONTROL APPARATUS
Filed Nov. 13, 1951
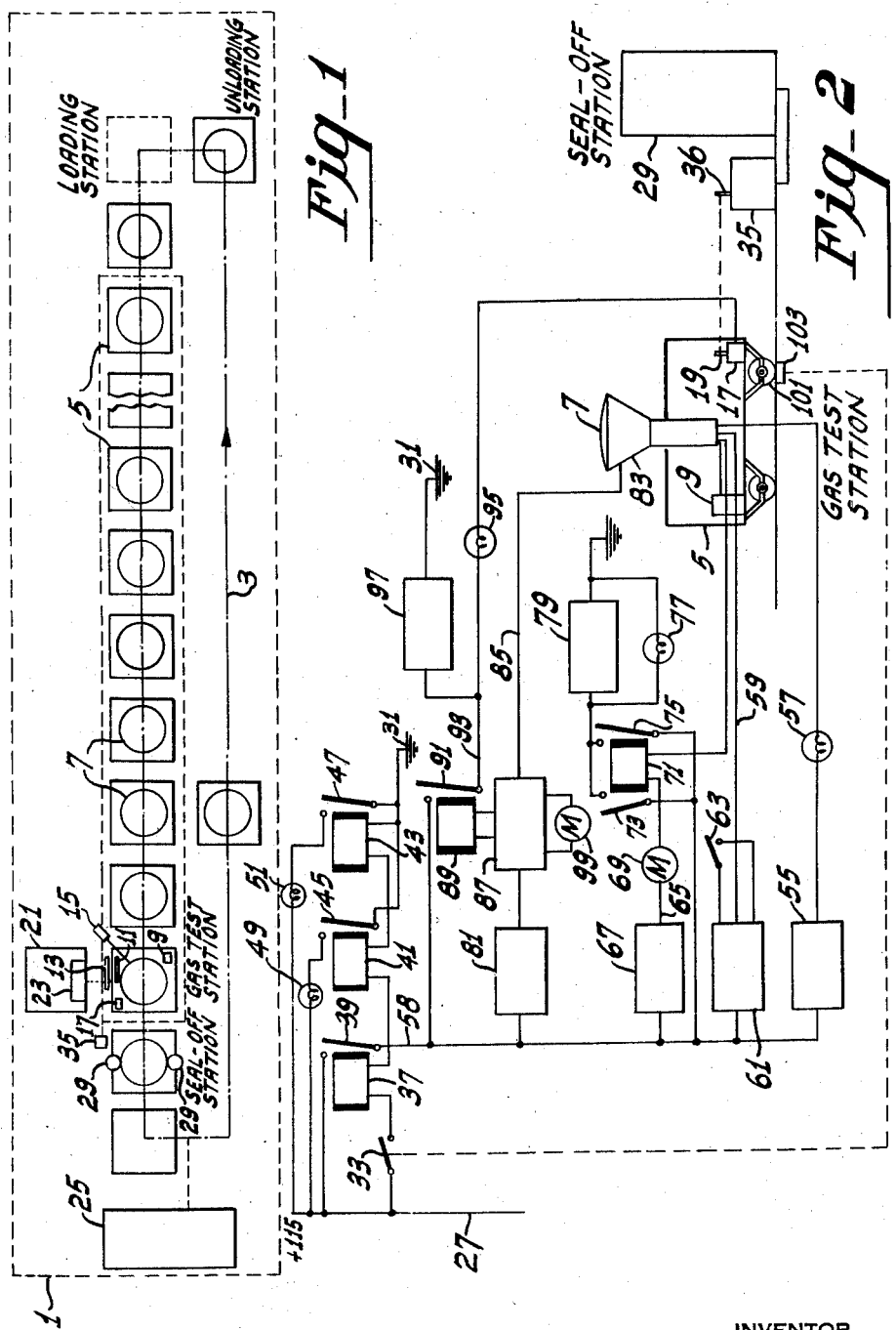
INVENTOR
Eugene E. Hoffmann
BY
William A. Zalesak
ATTORNEY

United States Patent Office 2,861,861
Patented Nov. 25, 1958

2,861,861

GAS PRESSURE TESTING AND CONTROL APPARATUS

Eugene E. Hoffmann, Lancaster, Pa., assignor to Radio Corporation of America, a corporation of Delaware Application November 13, 1951, Serial No. 256,051

9 Claims. (Cl. 316—27)

This invention pertains to an apparatus for manufacturing vacuum tubes and particularly to apparatus responsive to the vacuum conditions within the tube for controlling sealing-off operations.

According to systems of manufacture now generally in use vacuum tubes are completely assembled, exhausted and sealed before the residual gas content is measured. This method of operation, if the gas content of the tube is found to be excessive, requires that the tube be scrapped and thus completely wasted.

Accordingly, the main object of the invention is to provide a system for measuring the gas content of an evacuated vacuum tube before the tube has been finally sealed and automatically discontinuing any further operations on the tube if a defect is discovered.

This system is applicable, for example, in the processing of cathode ray tubes having an envelope containing an electron gun including a cathode, a plurality of grids and an anode and a screen against which electrons from the gun are directed. The mechanism comprises the apparatus known as a straight line exhaust machine which performs the function of exhausting, gettering and sealing off the tube. It includes apparatus for moving a plurality of tube-bearing carts, means for exhausting the tubes and a series of operational stations including one where the gas content of the tube is tested and another where the tube is sealed off. The carts are indexed from station to station in conventional fashion. In general this invention comprises evacuating the tube, testing the gas content of the tube by applying the appropriate potentials to the various electrodes and controlling further operations on the tube, particularly sealing-off, in response to the results of gas test.

The invention will now be described in detail with reference to the drawings wherein:

Fig. 1 represents a schematic diagram of one embodiment of my invention utilized in an apparatus for manufacturing cathode ray tubes;

Fig. 2 is a diagram of the components of the gas test and control system arranged in accordance with my invention.

Referring now to Fig. 1 there is shown a straight line exhaust machine 1 which comprises a continuous track 3 on which a plurality of carts 5 are arranged to travel in the direction of the arrow. Each cart starting from the loading position has a cathode ray tube mounted thereon and as the cart proceeds along the track in the direction of the arrow the various straight line exhaust machine operations are performed on the tube. Each cart also has mounted thereon an exhaust machine 9 which is connected to the tube during travel through the various operational positions or stations and electric potentials are provided to operate the carts and other mechanism associated with the track 3 from an electrical source 25. On each cart is also mounted a contactor panel 11 which connects the tube to circuit elements positioned along the track and a seal-off control switch 17 which comprises a conventional switch actuated rod 19. These last mentioned components are shown schematically on the cart located at the gas test position. In that position connection is made as shown schematically to a gas test machine 21 which has mounted thereon the gas test equipment and test indicating units 23 of the present invention.

At the gas test position or station there is provided, along the track, an anode contactor 15 and a contactor panel 13 which is arranged to make contact between the gas test machine 21 and the contactor panel 11.

At the next station, the seal-off station, there is located, along the track, a seal-off machine control switch 35 having a rod 36 which is designed and positioned to co-act with the seal-off control switch rod 19. The seal-off control switch 35, in turn, is arranged to control the operation of the seal-off mechanism 29 which may be a pinch-off machine such as that shown in U. S. patent to Phelps, 2,441,841, which is used for sealing off tubes having metal exhaust tubulation. For tubes having glass exhaust tubulation, a suitable sealing device is that shown in U. S. patent to Geiger et al., 2,403,073. Any other suitable form of sealing machine may be used.

Referring to Fig. 2, a power line 27 is energized from the electrical source 25 and supplies the electrical potentials for operating the various components of the gas test machine 21. The return path for the electrical system is represented by the ground symbols 31. The system is divided into two main sections with one branch consisting of a connection from the power line 27 through a switch 33 and a latch relay 37 having an armature 39 to two time delay relays 41 and 43 having armatures 45 and 47 respectively and then to the other side of the power line. The relay 41 keeps the test indicator alarms and bells from operating until the entire system has become stabilized and the relay 43 releases the cart from the gas test position at the end of the test period. Two pilot lights 49 and 51, or other suitable load circuits, are inserted in the leads to the armatures 45 and 47 respectively of the time delay relays to prevent short-circuiting of the power supply.

The other main branch of the system extends through a lead 58 which branches into four paths which contain the power supplies for the various tube electrodes and the alarm and control systems associated therewith. One path extends from the lead 58 through a suitable power supply 55 and an indicating lamp 57 to the cathode heater (not shown). Another lead 59 connects the first grid (not shown) of the cathode ray tube through a suitable bias voltage supply 61 to the lead 58 and power line 27. In this particular embodiment the supply 61 is arranged to maintain the first grid at an automatic bias level so that the system can be calibrated in terms of a ratio of microamperes of gas current flow to a fixed cathode current and a direct reading can be obtained. The automatic bias is maintained in conventional fashion by the use of a control voltage which is developed across an impedance (not shown) in the tube cathode current circuit. However, it is not necessary to have an automatic bias for the first grid to practice the principles of this invention. The source 61 is also provided with a manually operated switch 63 which may be operated to increase the bias on the first grid to cutoff for a purpose described below.

Another lead 65 which extends from a suitable power supply 67 for providing a constant voltage of approximately 400 volts on the second grid (not shown) of the cathode ray tube contains an ammeter 69 and a current relay 71 having two armatures 73 and 75 which are designed to remain open during current flow, in this particular instance, in the range of approximately 480 to 580 microamperes and arranged to close, one, on any value of current above this range and the other, on any value of current below this range. From the relay 71 a lead extends to an indicating lamp 77 and an alarm 79. High or low second grid current is not designed to operate to automatically inactivate the seal-off mechanism. It is merely an indication to the operator of the apparatus that there may be some fault in the system other than high gas, for example, improper tube electrode connections, faulty contact between the tube, the cart and other elements of the apparatus or some other fault which the operator should search out. The operator may manually operate the seal-off control switch 17 if he should deem it necessary. An anode power supply 81 is arranged to provide an negative potential of approximately 25 volts for the anode 83 through a lead 85. An impedance (not shown) is inserted in the lead 85 and provides a means for feeding a voltage into the input of a gas current amplifier 87 which may be any suitable arrangement for amplifying the input signal developed across the above-mentioned impedance (not shown). The amplifier 87 may comprise any D. C. amplifier having the desired sensitivity. The output circuit of the amplifier 87 is connected to a high-gas relay 89 having an armature 91 which is connected through a lead 93 to a high-gas light 95 and a high-gas alarm 97. The armature 91 of the relay 89 is also arranged to operate the seal-off rejector 17. A meter 99 reads current flow due to residual gas, and tube and circuit leakage.

The operation of the system is as follows: when a cart 5 approaches the gas test position, it is carrying a cathode ray tube 7 which has been evacuated by the gas exhaust machine 9 mounted on the cart. The forward wheel 101 of the cart contacts a switch 103 located along the track and this switch, in turn, operates the switch 33 to closed position which automatically sets the gas test in operation. The armature 39 of latch relay 37 is closed and the time delay relays 41 and 43 are energized. When the latch relay 37 is energized as a result of the closing of the switch 33, the various power supplies are energized and the proper operating voltages are applied to the tube electrodes.

The lamp 57 lights if the cathode heater is in good operating condition and, under the control of the potentials on the electrodes of the tube, any gas remaining therein due to leakage or faulty exhaust is ionized and the positive ions are attracted to the anode. The resultant current flow produces a voltage drop in the impedance input to the gas current amplifier 87 and the meter 99 reads the amount of current flow due to residual gas and tube and circuit leakage. If the resultant output current (due to residual gas and tube and circuit leakage) flowing through the relay 89 is larger than a predetermined amount the relay armature 91 closes and operates the high-gas lamp 95, the alarm 97 and the rejector switch 17 from which an actuator rod 19 is vertically projected. If it is desired to read the true value of gas current only, the manually operated switch 63 is closed, whereupon ionization within the tube is discontinued because the first grid is driven to cut-off and the meter 99 reads only circuit leakage. The true value of gas current is the difference between the two readings.

The current flow through the second grid is read in meter 69 and if it does not fall within the limits stated above for the relay 71 then one of the armatures 73 or 75 is urged to close and indicate high or low current by lighting the lamp 77 and by energizing the alarm 79. At this point, the pinch-off control switch 17 may be manually operated if deemed necessary by the operator.

When the period for the gas test has elapsed and the test has been completed, the cart is indexed into the seal-off position where the rod 19 engages and operates a similar rod 36 on the seal-off control switch 35 which thereby prevents operation of the seal-off device 29 by disconnecting its power supply (not shown). The seal-off device 29 being thus disabled, the tube is kept from being processed to any further extent and it continues on its way to be re-processed at a later time. The pinch-off control switch 17 may be operated by hand at any time during the cycle of operation if so desired.

From the foregoing discussion it will be apparent that the invention provides a system and method for testing the gas content of a vacuum tube during the manufacture thereof and controlling further operations in accordance with the results of the gas test.

What is claimed is:

1. In a multi-operational station processing system for a vacuum tube having an anode, a cathode, and a plurality of grids, means for exhausting the air from an unsealed tube; a gas test station and a later seal-off station for said unsealed tube, said gas test station comprising first means for developing a control voltage proportional to the volume of gas in said unsealed tube, means connected to said first means for disabling said seal-off station when said control voltage exceeds a predetermined amount, said gas test station also including other means for measuring current flow through one of said grids, and means connected to said other means for disabling manually said seal-off station in response to said grid current.

2. A vacuum tube processing system comprising a gas test station including means for testing the gas content of an unsealed tube at said station, and means responsive to the operation of said testing means for preventing sealing operations on said unsealed tube at a later seal-off station when the gas content exceeds a predetermined amount.

3. A vacuum tube processing system comprising means for testing the gas content of an unsealed tube at a first station, and a seal-off mechanism for said unsealed tube at a later station, said seal-off mechanism being connected to said gas test means, said seal-off mechanism being automatically disabled by said gas test means when the gas content of said tube exceeds a predetermined amount.

4. A vacuum tube processing system comprising means for testing the gas content of an unsealed tube at a first station, a seal-off mechanism at a later station for sealing off said tube, and means connected to said seal-off mechanism for preventing the operation of said seal-off mechanism when the gas content of said tube exceeds a predetermined limit.

5. A vacuum tube processing system comprising a gas test station and a late seal-off station, said gas test station including means for ionizing the gas present within said unsealed tube, means connected to said unsealed tube for collecting the ions of said ionized gas and developing a control voltage proportional to the volume of said ions, and means connected to said seal-off station for disabling the same when said control voltage exceeds a predetermined amount.

6. A vacuum tube processing system comprising a first station provided with apparatus adapted to be connected to an unsealed tube positioned at said station and responsive to residual gas within said unsealed tube, a seal-off apparatus at a second station for sealing off said tube, and connections between said gas responsive apparatus and said seal-off apparatus for preventing operation of said seal-off apparatus with respect to said tube when the gas content of said tube exceeds a predetermined limit.

7. A processing system for a cathode ray tube having a cathode, a plurality of grids, and an anode, said system comprising means including circuit means at one station for applying voltages to said cathode, grids and anode for ionizing residual gas in an unsealed tube, gas responsive apparatus including circuit means connected to said first mentioned circuit means for developing and amplifying a control voltage proportional to the volume of ions of said ionized gas, apparatus at a second station for sealing off said tube, and means including circuit means for preventing operation of said seal-off apparatus on said tube when the gas content of said tube exceeds a predetermined limit, said seal-off mechanism being operative to seal off said tube when the gas content is below said predetermined limit.

8. A processing system for vacuum tubes of the cathode ray type having a cathode, a plurality of grids, and an anode, said system comprising means including circuit means at a first station for applying voltages to the electrodes of an unsealed tube located at said station for the purpose of ionizing the gas contained in said tube, said circuit means including an impedance for developing a control voltage proportional to the volume of ions of the gas within said unsealed tube and also including means for amplifying said control voltage, switch means at said first station arranged to be actuated by said control voltage when said voltage exceeds a predetermined limit, and apparatus at a second station for sealing off said tube, said last mentioned apparatus being prevented from operating by said switch means when said voltage exceeds said limit, whereby said tube may proceed unsealed through said second station and be further exhausted.

9. A processing system for vacuum tubes of the cathode ray type, said system comprising a gas test station, a later seal-off station, a tube carrier movable between said stations, means on said carrier for exhausting an unsealed tube carried thereby, means at said gas test station for applying voltages to said unsealed tube for ionizing the gas content of said tube and for developing a control voltage proportional to the degree of ionization of said gas, means for amplifying said voltage, relay means arranged to operate when said control voltage exceeds a predetermined limit, switch means on said carrier arranged to be actuated in response to said relay means, and apparatus at said seal-off station for sealing off said tube, said last mentioned apparatus being prevented from operating by said switch means when said voltage exceeds said limit, whereby said tube may proceed unsealed through said seal-off station and be further exhausted.

References Cited in the file of this patent

UNITED STATES PATENTS

| | | |
|---|---|---|
| 1,710,428 | Mey | Apr. 23, 1929 |
| 1,736,766 | Burrows | Nov. 19, 1929 |
| 1,736,767 | Burrows | Nov. 19, 1929 |
| 1,814,437 | Du Mont | July 14, 1931 |
| 1,955,794 | Du Mont et al. | Apr. 24, 1934 |
| 2,023,628 | Van Sant | Dec. 10, 1935 |
| 2,249,605 | Freeman | July 15, 1941 |
| 2,353,783 | Noel | July 18, 1944 |
| 2,428,610 | Beggs | Oct. 7, 1947 |
| 2,532,315 | Johnson et al. | Dec. 5, 1950 |